(12) United States Patent
Brinkley et al.

(10) Patent No.: US 12,071,962 B2
(45) Date of Patent: Aug. 27, 2024

(54) RESERVOIR WITH VARIABLE CHARGE PRESSURE

(71) Applicant: CNH Industrial America LLC, New Holland, PA (US)

(72) Inventors: Jerry L. Brinkley, Woodridge, IL (US); Matthew Klopfenstein, Chenoa, IL (US); Michelle Lass Sterrett, Chicago, IL (US); Joshua Zimmerman, New Holland, PA (US); Hossein Gholizadeh, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 93 days.

(21) Appl. No.: 18/070,122

(22) Filed: Nov. 28, 2022

(65) Prior Publication Data
US 2024/0175452 A1 May 30, 2024

(51) Int. Cl.
| | |
|---|---|
| *F15B 1/26* | (2006.01) |
| *B60K 25/00* | (2006.01) |
| *F15B 13/044* | (2006.01) |
| *F15B 15/20* | (2006.01) |
| *B60K 31/06* | (2006.01) |
| *F15B 1/10* | (2006.01) |

(52) U.S. Cl.
CPC ............... *F15B 1/26* (2013.01); *B60K 25/00* (2013.01); *F15B 13/044* (2013.01); *F15B 15/20* (2013.01); *B60K 31/06* (2013.01); *F15B 1/10* (2013.01)

(58) Field of Classification Search
CPC .. F15B 1/26; F15B 1/10; F15B 13/044; F15B 15/20; B60K 25/00; B60K 31/06
USPC .... 137/571, 596.18, 565.18, 565.19, 565.32; 91/501, 502, 507, 172, 173; 92/13.2, 92/151, 249
See application file for complete search history.

(56) References Cited

U.S. PATENT DOCUMENTS

| | | | | |
|---|---|---|---|---|
| 625,471 | A * | 5/1899 | Scott | F01B 7/20 92/138 |
| 5,218,997 | A * | 6/1993 | Dunwoody | G05D 16/2097 137/596.18 |
| 8,291,934 | B2 * | 10/2012 | Gehlhoff | F15B 13/0426 137/596.2 |
| 2004/0055656 | A1 * | 3/2004 | Kurokawa | F16L 55/052 138/30 |
| 2007/0227801 | A1 * | 10/2007 | Loeffler | B60K 25/00 180/305 |
| 2012/0000557 | A1 * | 1/2012 | McBride | F15B 15/00 137/565.18 |

(Continued)

*Primary Examiner* — Minh Q Le
(74) *Attorney, Agent, or Firm* — Rickard K. DeMille; Rebecca L. Henkel; Peter K. Zacharias

(57) ABSTRACT

A fluid system includes a reservoir having a first reservoir chamber and a second reservoir chamber separated by a movable barrier, the first reservoir chamber being configured to contain a working fluid. The fluid system includes a piston housing defining an internal volume and a piston movable within the internal volume, the piston separating the internal volume into a first piston chamber and a second piston chamber, the second piston chamber being fluidly coupled to the second reservoir chamber. The fluid system includes a fluid supply configured to provide a control fluid to the first piston chamber.

20 Claims, 7 Drawing Sheets

(56) References Cited

U.S. PATENT DOCUMENTS

| | | | |
|---|---|---|---|
| 2013/0037340 A1* | 2/2013 | Brinkley | B62D 5/30 |
| | | | 180/421 |
| 2014/0102815 A1* | 4/2014 | Hancock, Sr. | B60K 25/00 |
| | | | 180/53.4 |
| 2014/0283915 A1* | 9/2014 | Ma | E02F 9/2292 |
| | | | 137/1 |
| 2015/0298730 A1* | 10/2015 | Wiktor | E02F 9/2228 |
| | | | 91/468 |
| 2016/0208832 A1* | 7/2016 | Du | F15B 19/005 |
| 2017/0002841 A1* | 1/2017 | Neutsch | B60T 17/06 |
| 2018/0127109 A1* | 5/2018 | Freeth | B64D 37/16 |
| 2021/0207621 A1* | 7/2021 | Zimmerman | F15B 11/0426 |
| 2021/0222402 A1* | 7/2021 | Zimmerman | F15B 7/006 |
| 2022/0356677 A1* | 11/2022 | Miyamoto | F15B 21/087 |
| 2023/0060833 A1* | 3/2023 | Maher | F15B 13/044 |
| 2023/0149754 A1* | 5/2023 | Linsmeier | B60K 25/02 |
| | | | 169/24 |

\* cited by examiner

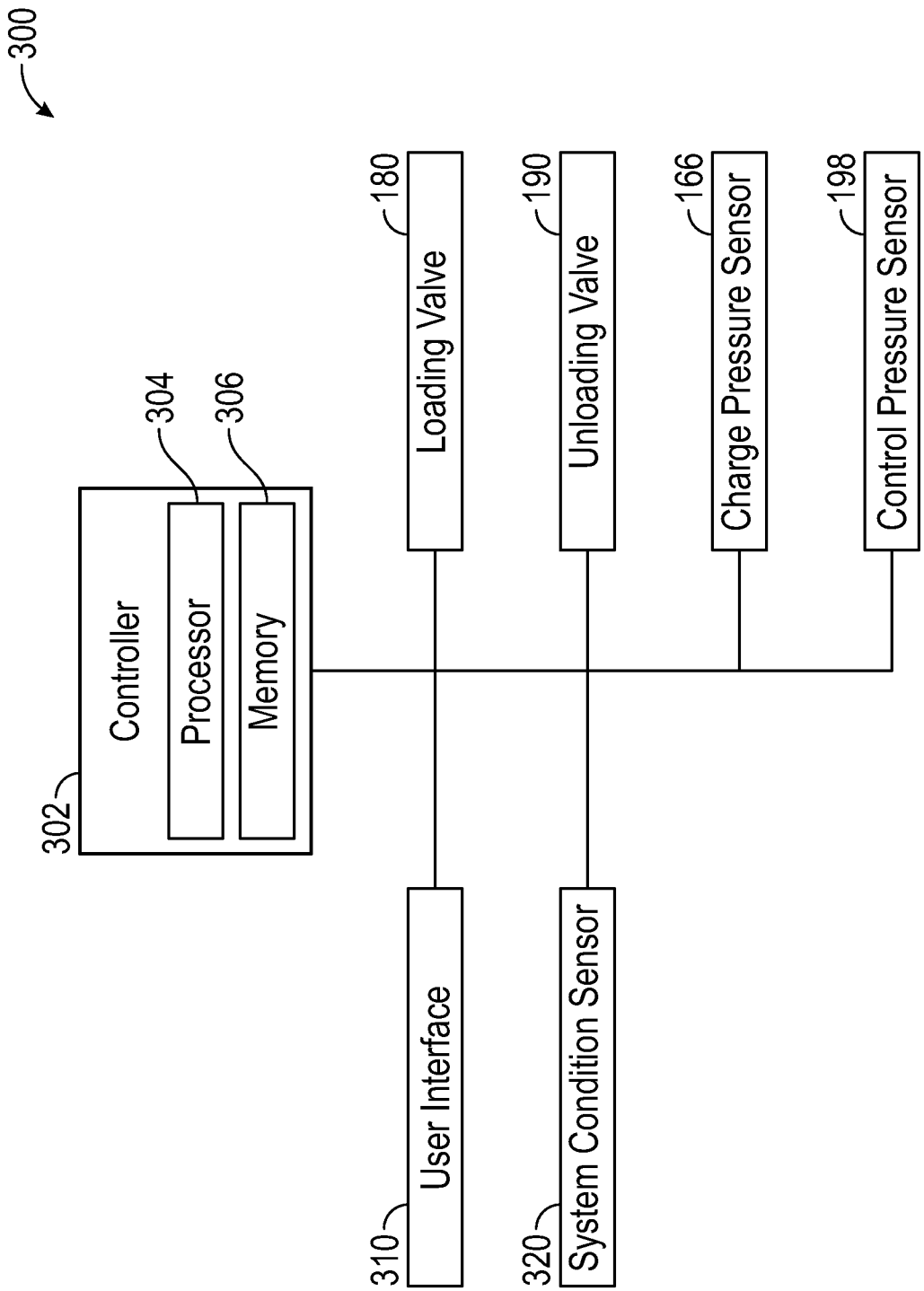

RESERVOIR WITH VARIABLE CHARGE PRESSURE

BACKGROUND

The present disclosure relates generally to fluid systems, such as hydraulic systems, pneumatic systems, or combination hydraulic/pneumatic systems. More specifically, the present disclosure relates to a fluid system for a vehicle.

Some fluid systems include reservoirs, such as accumulators or attenuators, that contain a volume of working fluid (e.g., hydraulic oil or gas) in communication with a volume of charge fluid (e.g., a pressurized gas, such as an inert gas) through a bladder. In an accumulator that includes a single port, the charge fluid may apply a bias that directs the working fluid out of the accumulator. In an attenuator that includes an inlet port and an outlet port, the charge fluid may apply a bias that resists an increase in the total volume of working fluid within the attenuator. In such systems, the amount of charge fluid within the reservoir is fixed, such that the response of the reservoir to a given input is fixed.

SUMMARY

One embodiment relates to a fluid system. The fluid system includes a reservoir having a first reservoir chamber and a second reservoir chamber separated by a movable barrier, the first reservoir chamber being configured to contain a working fluid. The fluid system includes a piston housing defining an internal volume and a piston movable within the internal volume, the piston separating the internal volume into a first piston chamber and a second piston chamber, the second piston chamber being fluidly coupled to the second reservoir chamber. The fluid system includes a fluid supply configured to provide a control fluid to the first piston chamber.

Another embodiment relates to a vehicle. The vehicle includes a chassis, a tractive element coupled to the chassis, an actuator coupled to the chassis, and a fluid system. The fluid system includes a reservoir having a first chamber and a second chamber separated by a first movable barrier, the first chamber being fluidly coupled to the actuator and containing a first hydraulic fluid, a housing defining an internal volume, and a second movable barrier within the internal volume. The second movable barrier separates the internal volume into a third chamber and a fourth chamber, the third chamber being fluidly coupled to the second chamber, and the second and third chambers containing a gas. The fluid system includes a fluid supply configured to provide a second hydraulic fluid to the fourth chamber.

Still another embodiment relates to a fluid system. The fluid system includes a first chamber fluidly coupled to an actuator, a second chamber containing a gas, a first movable barrier at least partially defining the first chamber and the second chamber, a third chamber fluidly coupled to the second chamber and containing the gas, a fourth chamber, a second movable barrier at least partially defining the third chamber and the fourth chamber, a first valve fluidly coupled to the fourth chamber and configured to direct a control fluid into the fourth chamber to move the second movable barrier in a first direction that decreases a volume of the third chamber, and a second valve fluidly coupled to the fourth chamber and configured to direct the control fluid out of the fourth chamber to move the second movable barrier in a second direction that increases the volume of the third chamber.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 8 is a block diagram of a control system of the vehicle of FIG. 1.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a fluid system (e.g., a combination hydraulic and pneumatic system). The fluid system includes a reservoir, such as an accumulator or attenuator, having a working fluid chamber and a first charge fluid chamber separated by a bladder. The fluid system further includes a piston housing having a second charge fluid chamber and a control fluid chamber separated by a piston. The charge fluid chambers are fluidly coupled to one another and contain a pressurized gas.

A first valve can be opened to direct control fluid (e.g., hydraulic fluid) into the control fluid chamber. This control fluid forces the piston to move in a first direction that reduces the volume of the second control chamber and forces additional pressurized gas into the reservoir, increasing the charge pressure of the reservoir. A second valve can be opened to drain the control fluid from the control fluid chamber. This permits the piston to move in a second direction that increases the volume of the second control chamber and permits pressurized gas to leave the reservoir, decreasing the charge pressure of the reservoir. A controller may control the two valves to vary the charge pressure (e.g., according to a user input or based on a sensor input), varying the response of the fluid system to various inputs that would force working fluid into the reservoir.

Overall Vehicle

Figure 1:
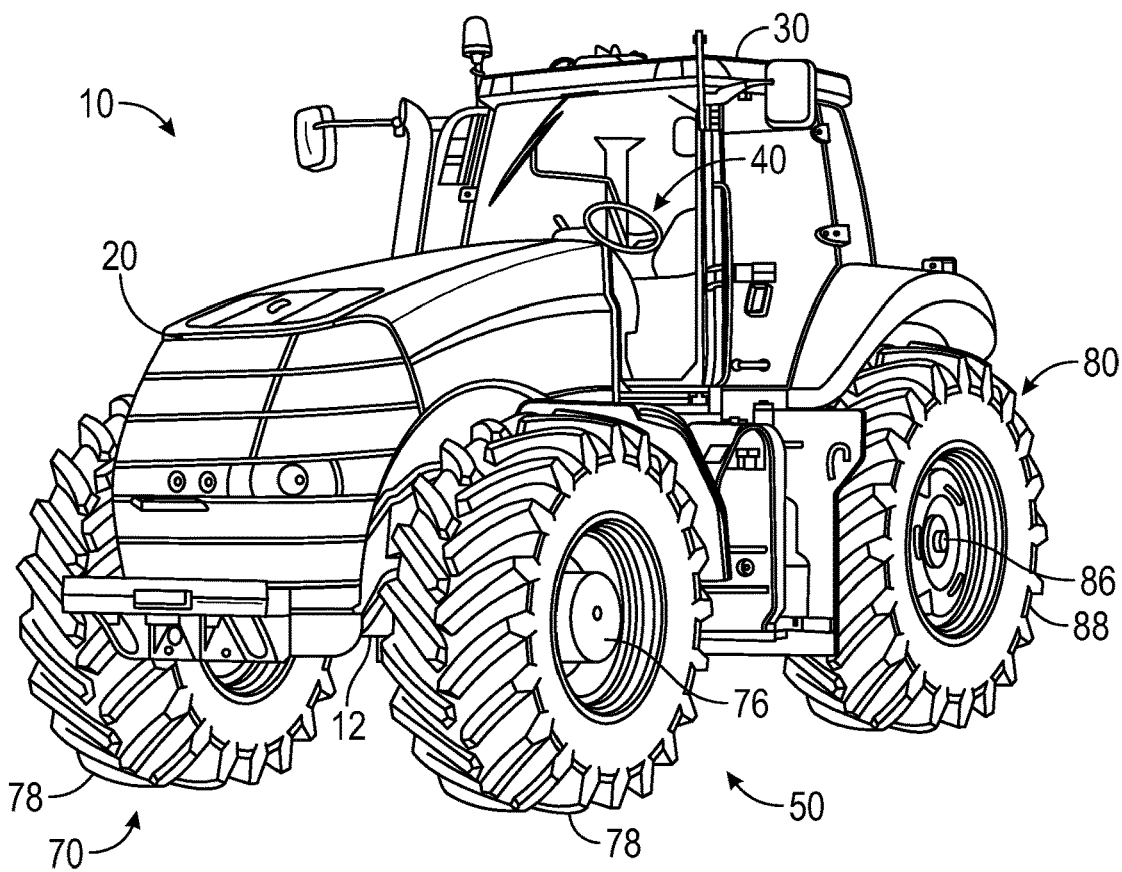
FIG. 1 is a perspective view of a vehicle, according to an exemplary embodiment.
Figure 2:
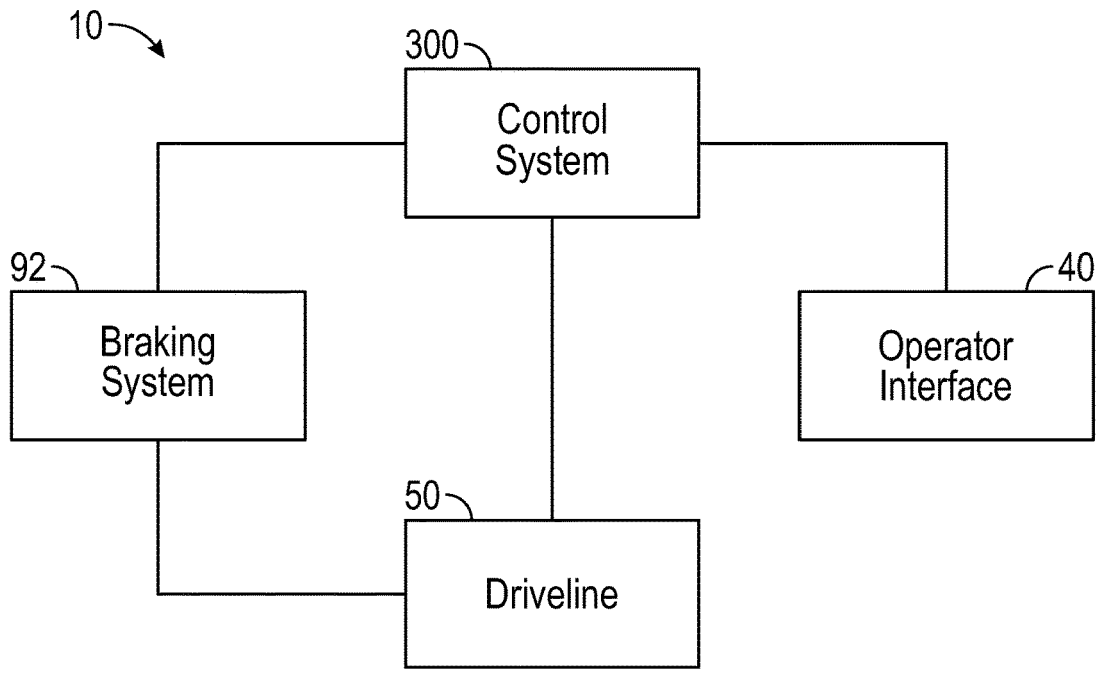
FIG. 2 is a schematic block diagram of the vehicle of FIG. 1, according to an exemplary embodiment.
Figure 3:
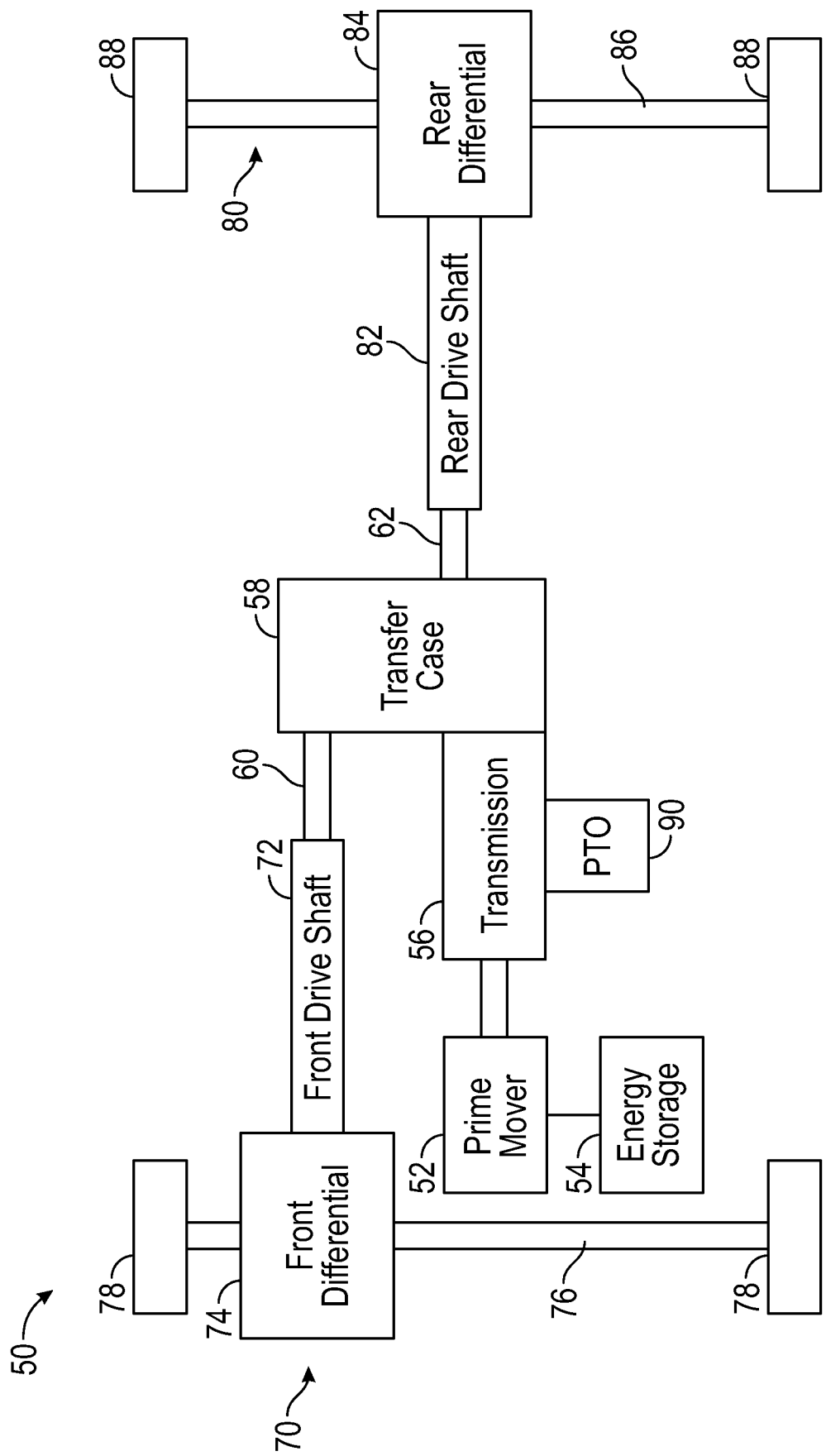
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 300, coupled to the operator interface 40, the driveline 50, and the braking system 92. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Fluid System—Accumulator

Figure 4:
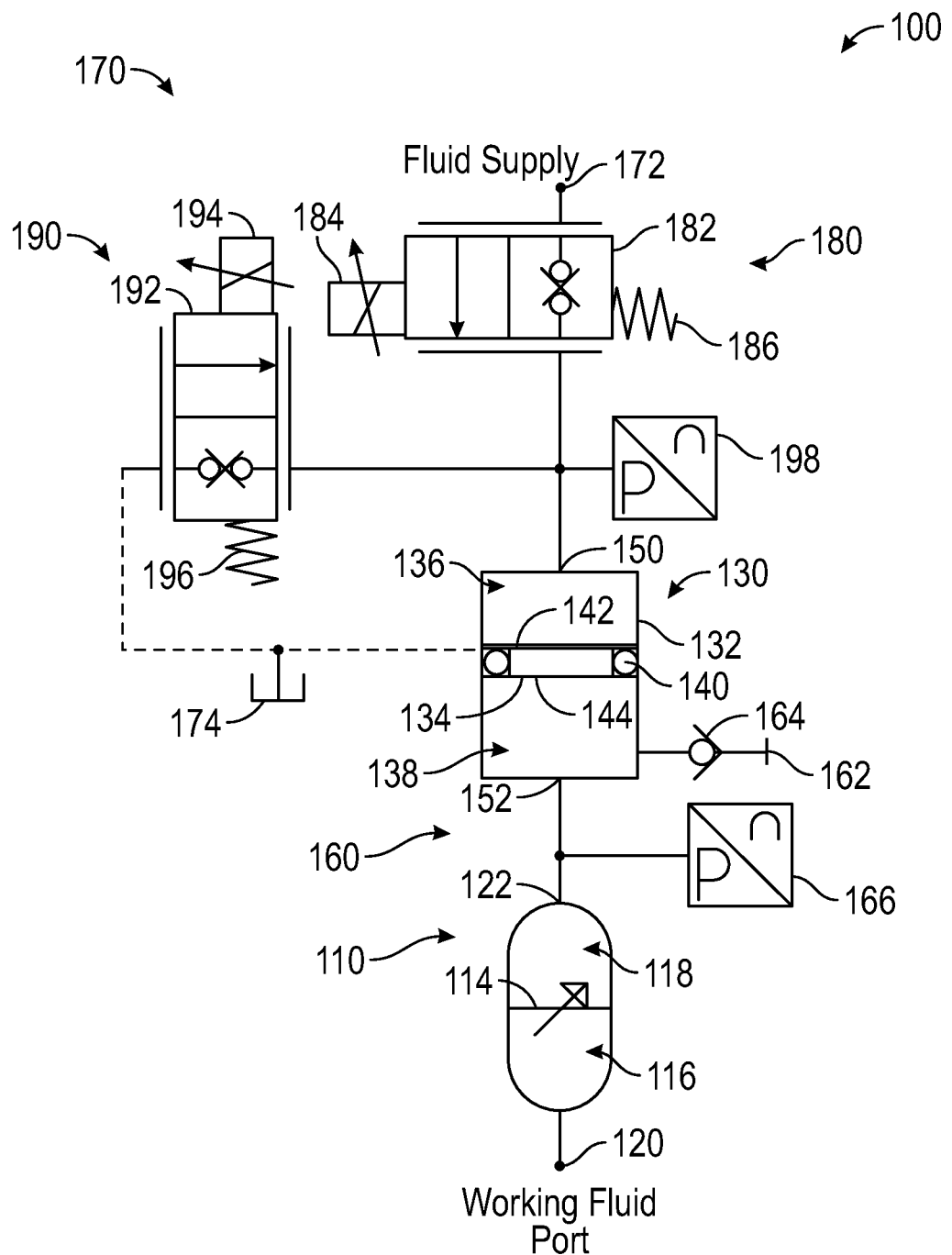
FIG. 4 is a schematic of a fluid system of the vehicle of FIG. 1, according to an exemplary embodiment.

Referring to FIG. 4, the vehicle 10 includes a fluid system (e.g., a hydraulic system, a pneumatic system, a combination hydraulic and pneumatic system, etc.), shown as fluid system 100. The fluid system 100 may control, power, or otherwise operate various systems of the vehicle 10 by supplying pressurized fluid, such as hydraulic oil or nitrogen gas. By way of example, the fluid system 100 may facilitate operation of the driveline 50, the braking system 92, a suspension system, an implement (e.g., a plow, a mower, a hitch, a tedder, a rake, a baler, a cultivator, a rotavator, a tiller, a harvester, etc.), or another system of the vehicle 10.

Referring still to FIG. 4, the fluid system 100 includes a reservoir, shown as accumulator 110. The accumulator 110 includes a case or body, shown as housing 112, having an internal volume. A movable barrier, shown as bladder 114, is positioned within the housing 112 and separates or divides the internal volume into a first reservoir chamber, shown as working fluid chamber 116, and a second reservoir chamber, shown as charge chamber 118. As shown, the bladder 114 is made of a flexible material that is fixed to the housing 112 along an edge to fluidly decouple the working fluid chamber 116 from the charge chamber 118, preventing the exchange of fluids between the working fluid chamber 116 and the charge chamber 118. In other embodiments, the bladder 114 is replaced with another type of movable barrier, such as a piston.

The working fluid chamber 116 is filled with a working fluid that is utilized by another component of the vehicle. Specifically, the housing 112 defines a first inlet/outlet port, shown as working fluid port 120, through which fluid may enter or exit the working fluid chamber 116. The working fluid port 120 may be fluidly coupled to another component of the vehicle 10 to facilitate transmission of the working fluid between the component and the working fluid chamber 116. In some embodiments, the working fluid is liquid, such as hydraulic fluid (e.g., hydraulic oil). In other embodiments, the working fluid is a gas, such as air or an inert gas (e.g., nitrogen).

The charge chamber 118 is filled with a charge fluid. In some embodiments, the charge fluid is a pressurized gas. In some such embodiments, the charge fluid is an inert gas. In some such embodiments, the charge fluid is nitrogen. In other embodiments, the charge fluid is a different type of gas, such as air or argon. The charge fluid within the charge chamber 118 is pressurized and applies an outward pressure on the housing 112 and the bladder 114. The housing 112 defines a second inlet/outlet port, shown as charge port 122, through which charge fluid may enter or exit the charge chamber 118.

The movable nature of the bladder 114 permits the communication of pressures between the working fluid chamber 116 and the charge chamber 118 while preventing mixing of the working fluid with the charge fluid. Specifically, the pressure of the charge fluid exerts a force on the bladder 114, which in turn exerts a force on the working fluid. Similarly, the pressure of the working fluid exerts a force on the bladder 114, which in turn exerts a force on the working fluid. By way of example, if the pressure of the charge fluid in the charge chamber 118 increases, the pressure of the working fluid in the working fluid chamber 116 may also increase. By way of another example, if the pressure of the working fluid in the working fluid chamber 116 decreases, the pressure of the charge fluid in the charge chamber 118 may also decrease.

In some embodiments, the charge fluid is more compressible than the working fluid. By way of example, the charge fluid may be a compressible gas, and the working fluid may be a generally incompressible hydraulic oil. When working fluid is added to the working fluid chamber 116, the volume of the working fluid chamber 116 may increase, and the volume of the charge chamber 118 may decrease a corresponding amount. This compresses the charge fluid, increasing the pressure of the charge fluid and the force exerted on the bladder 114 by the charge fluid. Accordingly, the charge fluid applies a biasing force on the working fluid through the bladder 114, biasing the working fluid out of the working fluid chamber 116. In this way, the biasing force of the bladder 114 and the charge fluid may force be overcome to store working fluid in the accumulator 110 or may be used to dispense working fluid from the accumulator 110.

In some embodiments, the bladder 114 may have a fully expanded configuration, in which the volume of the working fluid chamber 116 is maximized, and/or a fully collapsed configuration, in which the volume of the charge chamber 118 is maximized. The fully expanded configuration and the fully collapsed configuration may be defined by the geometry of the accumulator 110. By way of example, the fully expanded configuration may be defined when the bladder 114 comes into contact with the housing 112 and can no longer expand any further. The response of the accumulator 110 in fully expanded configuration or the fully retracted configuration may differ from the response of the accumulator between the fully expanded configuration and the fully retracted configuration. By way of example, in the fully expanded configuration, further increasing the pressure of the working fluid may not result in a further compression of the charge chamber 118, as the charge chamber 118 may already be in a minimum volume condition. By way of another example, in the fully collapsed configuration, further increasing the pressure of the charge fluid may not result in an increase in the pressure of the working fluid.

The fluid system 100 may be configured to vary the amount (e.g., mass) of the charge fluid within the charge chamber 118 (e.g., by adding or removing charge fluid through the charge port 122). By varying the amount of charge fluid within the charge chamber 118, the biasing force applied by the bladder 114 and the charge fluid may be varied. By way of example, by introducing additional charge fluid into the charge chamber 118, the fluid system 100 may increase the pressure of the working fluid required to store a given volume of working fluid in the accumulator 110. In this way, the fluid system 100 may tune the response of the accumulator 110 to certain inputs (e.g., to an introduction of working fluid into the accumulator 110).

One point of comparison for the performance of the accumulator 110 is the charge pressure (e.g., a precharge pressure) of the accumulator 110. The charge pressure represents the pressure of the charge fluid with the working fluid at atmospheric pressure or with the working fluid emptied from the accumulator 110. In other systems, the charge pressure for accumulators is fixed, as the amount of gas within the accumulator is fixed. However, the fluid system 100 is capable of adjusting the amount of charge fluid within the accumulator 110 to adjust the charge pressure of the accumulator as desired.

Referring still to FIG. 4, the fluid system 100 further includes a pressure communication assembly, shown as piston assembly 130. The piston assembly 130 includes a case or body, shown as piston housing 132, defining an internal volume of the piston assembly 130. Positioned within the piston housing 132 is a movable barrier, shown as piston 134. Specifically, the piston 134 is slidably coupled to the piston housing 132, such that the piston 134 is movable along a length of the piston housing 132. The piston 134 divides the internal volume of the piston housing 132 into a first piston chamber, shown as control fluid chamber 136, and a second piston chamber, shown as charge chamber 138.

The piston 134 includes a sealing assembly, shown as seal 140, that engages an inner surface of the piston housing 132 to fluidly decouple the control fluid chamber 136 and the charge chamber 138. The seal 140 prevents the exchange of fluids between the control fluid chamber 136 and the charge chamber 138. The piston 134 further includes a first side or surface, shown as control surface 142, and a second side or control surface, shown as charge surface 144. The control surface 142 faces and is exposed to the control fluid chamber 136. The charge surface 144 faces and is exposed to the charge chamber 138. The control surface 142 opposes (i.e., faces opposite the direction of) the charge surface 144.

In some embodiments, the surface area of the control surface 142 is substantially equal to the surface area of the charge surface 144. In such a configuration, when the piston 134 is free to move (e.g., not at an end of travel), the pressure of the control fluid chamber 136 and the charge chamber 138 may be substantially equal. In other embodiments, the surface area of the control surface 142 is not equal to the surface area of the charge surface 144. In such a configuration, when the piston 134 is free to move (e.g., not at an end of travel), the ratio of the pressure of the control fluid chamber 136 to the pressure of the charge chamber 138 may be a function of the ratio of the surface area of the control surface 142 to the surface area of the charge surface 144.

The control fluid chamber 136 is filled with a control fluid that is used to control movement of the piston 134. Specifically, the piston housing 132 defines a first inlet/outlet port, shown as control port 150, through which control fluid may enter or exit the control fluid chamber 136. As shown, the control port 150 is positioned at the end of the piston housing 132 opposite the control surface 142, such that the control port 150 remains in fluid communication with the control fluid chamber 136 regardless of the position of the piston 134. In some embodiments, the control fluid is a liquid, such as hydraulic fluid (e.g., hydraulic oil). In some embodiments, the control fluid be the same fluid as the working fluid. By way of example, the control fluid and the working fluid may both be hydraulic oil that is circulated throughout a common hydraulic system. In such an example, hydraulic oil may circulate throughout the entire system, such that a given volume of hydraulic oil may act as the working fluid, then subsequently act as the control fluid or vice versa.

The charge chamber 138 is filled with the charge fluid. The piston housing 132 defines a second inlet/outlet port, shown as charge port 152, through which the charge fluid may enter or exit the charge chamber 138. As shown, the charge port 152 is positioned at the end of the piston housing 132 opposite the charge surface 144, such that the charge port 152 remains in fluid communication with the charge chamber 138 regardless of the position of the piston 134.

As shown in FIG. 4, the charge port 152 is fluidly coupled to the charge port 122, such that the charge chamber 118 is in fluid communication with the charge chamber 138, forming a charge circuit 160. The charge circuit 160 may be a closed circuit, such that charge fluid within the charge circuit 160 is not permitted to exit the charge circuit 160 during operation of the fluid system 100. Accordingly, the amount of charge fluid within the charge circuit 160 may be fixed unless additional charge fluid is added.

The charge fluid throughout the charge circuit 160 may be at the same pressure. By way of example, the charge fluid within the charge chamber 118 may have the same pressure as the charge fluid within the charge chamber 138. Accordingly, if the pressure within the charge chamber 118 changes, the pressure within the charge chamber 118 may change accordingly.

During operation, movement of the piston 134 may cause a corresponding variance in the amount (e.g., mass) of the charge fluid within the charge chamber 118. By way of example, if the piston 134 moves to decrease the volume of the charge chamber 138 (e.g., downward as shown in FIG. 4), charge fluid may be forced out of the charge chamber 138, and the amount of charge fluid in the charge chamber 118 may increase. By way of another example, if the piston 134 moves to increase the volume of the charge chamber 138 (e.g., upward as shown in FIG. 4), charge fluid may exit the charge chamber 118 and pass into the charge chamber 138.

As shown in FIG. 4, the fluid system 100 further includes a charge port, shown as service port 162, that is in fluid communication with the charge chamber 138 through a one-way valve, shown as check valve 164. The service port 162 facilitates introducing additional charge fluid into the charge circuit 160. By way of example, charge fluid may pass freely into the charge chamber 138 through the service port 162 and the check valve 164. Once within the charge circuit 160, the check valve 164 prevents the charge fluid from exiting the charge circuit 160. The service port 162 may be used exclusively outside of normal operation of the fluid system 100. By way of example, the service port 162 may be used during a maintenance procedure (e.g., after draining the charge circuit 160 to replace a component) or during initial setup of the fluid system 100.

The charge circuit 160 further includes a pressure sensor (e.g., a pressure transducer), shown as charge pressure sensor 166. The charge pressure sensor 166 is fluidly coupled to the charge chamber 118 and the charge chamber 138. The charge pressure sensor 166 is configured to measure the pressure of the charge fluid within the charge circuit 160. The charge pressure sensor 166 may provide signals (e.g., pressure data, pressure signals) indicating the measured pressure. By way of example, the charge pressure sensor 166 may be an electronic pressure transducer.

Referring still to FIG. 4, the fluid system 100 further includes a hydraulic control circuit, shown as control circuit 170. The control circuit 170 controls (e.g., regulates) the amount of control fluid within the control fluid chamber 136 to control the position of the piston 134. By way of example, the control circuit 170 may introduce control fluid into the control fluid chamber 136 to force the piston 134 downward as shown in FIG. 4. By way of another example, the control circuit 170 may remove control fluid from the control fluid chamber 136 to permit the piston 134 to move upward as shown in FIG. 4. In some embodiments, the pressure of the charge fluid is sufficient to force the piston 134 in this direction without a pump or other component introducing a negative pressure in the control fluid chamber 136.

The control circuit 170 includes a source of pressurized control fluid, shown as fluid supply 172. The fluid supply 172 may include a pump, a source of stored pressurized control fluid (e.g., an accumulator or other reservoir of control fluid), or another type of fluid source. The control circuit 170 may be directly fluidly coupled to the fluid supply 172, or indirectly connected through one or more components of a fluid circuit. In some embodiments, the fluid supply 172 supplies hydraulic oil at between 20 bar and 25 bar.

The control circuit 170 further includes a low-pressure fluid return, shown as tank 174. The tank 174 contains control fluid at a relatively low pressure (e.g., atmospheric pressure) that is less than then pressure of the control fluid supplied by the fluid supply 172. In some embodiments, the tank 174 and the fluid supply 172 are operatively coupled such that control fluid returned at a low pressure to the tank 174 is pressurized (e.g., by a pump) and returned to the control circuit 170 by the fluid supply 172.

As shown in FIG. 4, the tank 174 may be fluidly coupled to the seal 140 of the piston 134. The fluid coupling may permit control fluid that would otherwise leak past the seal 140 to instead be directed to the tank 174. It may be important to prevent such leakage in order to prevent contamination of the charge fluid (e.g., nitrogen) with control fluid (e.g., hydraulic oil).

The control circuit 170 includes a first flow control device, shown as loading valve 180, fluidly coupled to the fluid supply 172 and the control fluid chamber 136. The loading valve 180 is configured to selectively fluidly couple the fluid supply 172 to the control fluid chamber 136 to permit control fluid to flow from the fluid supply 172 to the control fluid chamber 136. The loading valve 180 includes a movable spool, shown as spool 182, that either blocks or permits the flow of control fluid based on a position of the spool 182. Specifically, the spool 182 is movable between a first position, in which the spool 182 blocks the flow, and a second position, in which the spool 182 permits the flow. In some embodiments, the spool 182 includes a pair of check valves that block flow through the spool 182 in both directions with the spool 182 in the first position.

As shown, the loading valve 180 is a proportionally-controlled solenoid valve. Movement of the spool 182 between the first position and the second position is controlled by an actuator, shown as solenoid 184, and a biasing element, shown as spring 186. The spring 186 biases the spool 182 toward the first position, in which the spool 182 blocks the flow of control fluid. Accordingly, the loading valve 180 is a normally-closed valve. When activated, the solenoid 184 applies a force to the spool 182 that opposes the biasing force of the spring 186, moving the spool 182 toward the second position, in which the spool 182 permits the flow of control fluid.

As the loading valve 180 is a proportional control valve, the spool 182 is movable to various intermediate positions between the first position and the second position to permit continuous adjustment of the flow rate through the loading valve 180. Specifically, movement of the spool 182 adjusts the loading valve 180 between the blocked flow condition of the first position and the open flow condition of the second position. By way of example, the spool 182 can be moved to positions associated with 10%, 30%, 50%, 75%, 90%, etc. of the maximum, open flow condition. In some embodiments, the solenoid 184 is operating using pulse width modulation (PWM) control to reach the target position of the spool 182.

The control circuit 170 includes a second flow control device, shown as unloading valve 190, fluidly coupled to the control fluid chamber 136 and the tank 174. The unloading valve 190 is configured to selectively fluidly couple the control fluid chamber 136 to the tank 174 to permit control fluid from the control fluid chamber 136 to flow to the tank 174. The unloading valve 190 includes a movable spool, shown as spool 192, that either blocks or permits the flow of control fluid based on a position of the spool 192. Specifically, the spool 192 is movable between a first position, in which the spool 192 blocks the flow, and a second position, in which the spool 192 permits the flow. In some embodiments, the spool 192 includes a pair of check valves that block flow through the spool 192 in both directions with the spool 192 in the first position.

As shown, the unloading valve 190 is a proportionally-controlled solenoid valve. Movement of the spool 192 between the first position and the second position is controlled by an actuator, shown as solenoid 194, and a biasing element, shown as spring 196. The spring 196 biases the spool 192 toward the first position, in which the spool 192 blocks the flow of control fluid. Accordingly, the unloading valve 190 is a normally-closed valve. When activated, the solenoid 194 applies a force to the spool 192 that opposes the biasing force of the spring 196, moving the spool 192 toward the second position, in which the spool 192 permits the flow of control fluid.

As the unloading valve 190 is a proportional control valve, the spool 192 is movable to various intermediate positions between the first position and the second position to permit continuous adjustment of the flow rate through the unloading valve 190. Specifically, movement of the spool 192 adjusts the unloading valve 190 between the blocked flow condition of the first position and the open flow condition of the second position. By way of example, the spool 192 can be moved to positions associated with 10%, 30%, 50%, 75%, 90%, etc. of the maximum, open flow condition. In some embodiments, the solenoid 194 is operating using PWM control to reach the target position of the spool 192.

The control circuit 170 further includes a pressure sensor (e.g., a pressure transducer), shown as control pressure sensor 198. The control pressure sensor 198 is fluidly coupled to the control fluid chamber 136. The control pressure sensor 198 is configured to measure the pressure of the control fluid near or within the control fluid chamber 136. The control pressure sensor 198 may provide signals (e.g., pressure data) indicating the measured pressure. By way of example, the control pressure sensor 198 may be an electronic pressure transducer.

Referring still to FIG. 4, during operation of the fluid system 100, the loading valve 180 and the unloading valve 190 may be operated to vary the amount of charge fluid in the accumulator 110. To increase the amount of charge fluid in the accumulator 110 (e.g., increasing the charge pressure of the accumulator), the loading valve 180 is opened (e.g., moved to the second position) and the unloading valve 190 is closed (e.g., moved to the first position). By opening the loading valve 180, control fluid from the fluid supply 172 passes through the spool 182 and enters the control fluid chamber 136. The control fluid forces the piston 134 away from the control port 150, increasing the volume of the control fluid chamber 136 and decreasing the volume of the charge chamber 138. The piston 134 forces the charge fluid out of the charge chamber 138 and into the charge chamber 118, increasing the amount of charge fluid in the charge chamber 118. By increasing the amount of charge fluid in the charge chamber 118, the charge pressure of the accumulator is increased.

To decrease the amount of charge fluid in the accumulator 110 (e.g., decreasing the charge pressure of the accumulator 110), the loading valve 180 is closed (e.g., moved to the first position) and the unloading valve 190 is opened (e.g., moved to the second position). By opening the unloading valve 190, control fluid from the control fluid chamber 136 is permitted to pass through the spool 192 and to the tank 174. The pressure of the charge fluid forces the piston 134 toward the control port 150, decreasing the volume of the control fluid chamber 136 and increasing the volume of the charge chamber 138. This increase in the volume of the charge chamber 138 permits charge fluid to pass from the charge chamber 118 back into the charge chamber 138, decreasing the amount of charge fluid in the charge chamber 118. By decreasing the amount of charge fluid in the charge chamber 118, the charge pressure of the accumulator is decreased.

Figure 5:
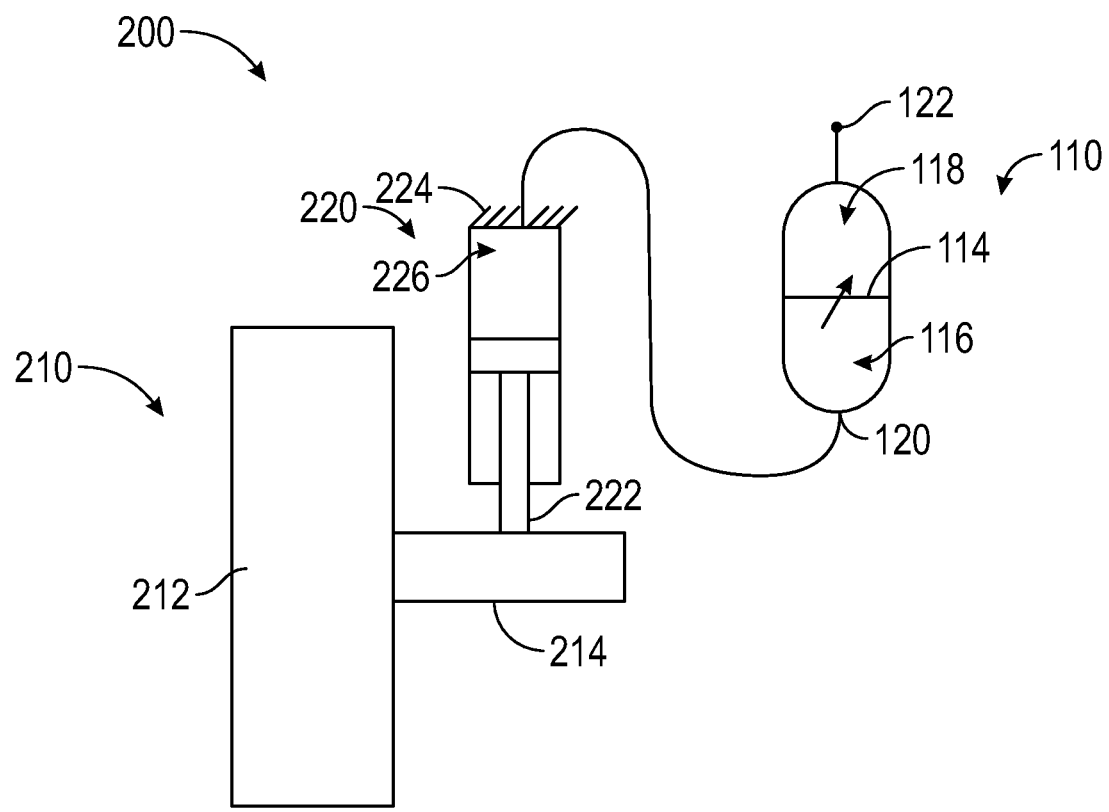
FIG. 5 is a schematic block diagram of a suspension system of the vehicle of FIG. 1 that is controlled by the fluid system of FIG. 4, according to an exemplary embodiment.

Referring to FIG. 5, an implementation of the fluid system 100 is shown according to an exemplary embodiment. It should be understood that this is intended as a non-limiting example, and the fluid system 100 may be used with other systems according to other exemplary embodiments.

As shown in FIG. 5, the fluid system 100 is used to control a suspension system 200. The suspension system 200 includes a wheel end assembly 210 including a tractive element 212 (e.g., a front tractive element 78, a rear tractive element 88, etc.) coupled to a support, shown as axle end 214. The axle end 214 is movable to permit vertical travel of the tractive element 212. The axle end 214 is coupled to a control element (e.g., a cylinder, a spring, etc.) or actuator, shown as strut 220. The strut 220 includes a first end portion, shown as rod end portion 222, that is coupled to the axle end 214. The strut 220 further includes a second end portion, shown as cap end portion 224, that is coupled to the frame 12. The strut 220 defines a chamber 226 that is filled with working fluid and fluidly coupled to the working fluid port 120 of the accumulator 110. The outward pressure of the working fluid is directed to expanding the strut 220 and raising the frame 12 relative to the tractive element 212. Accordingly, the pressure of the charge fluid in the accumulator 110 forces the working fluid into the chamber 226, expanding the strut 220 and raising the frame 12.

Varying the charge pressure of the accumulator 110 varies the response of the suspension system 200 to various inputs. By way of example, controlling the fluid system 100 to direct additional charge fluid into the charge chamber 118 may increase the pressure within the charge chamber 118. This increase in pressure may cause the strut 220 to expand, raising the ride height of the vehicle 10. Accordingly, the fluid system 100 may be utilized to control the ride height of the vehicle 10.

Fluid System—Attenuator

Figure 6:
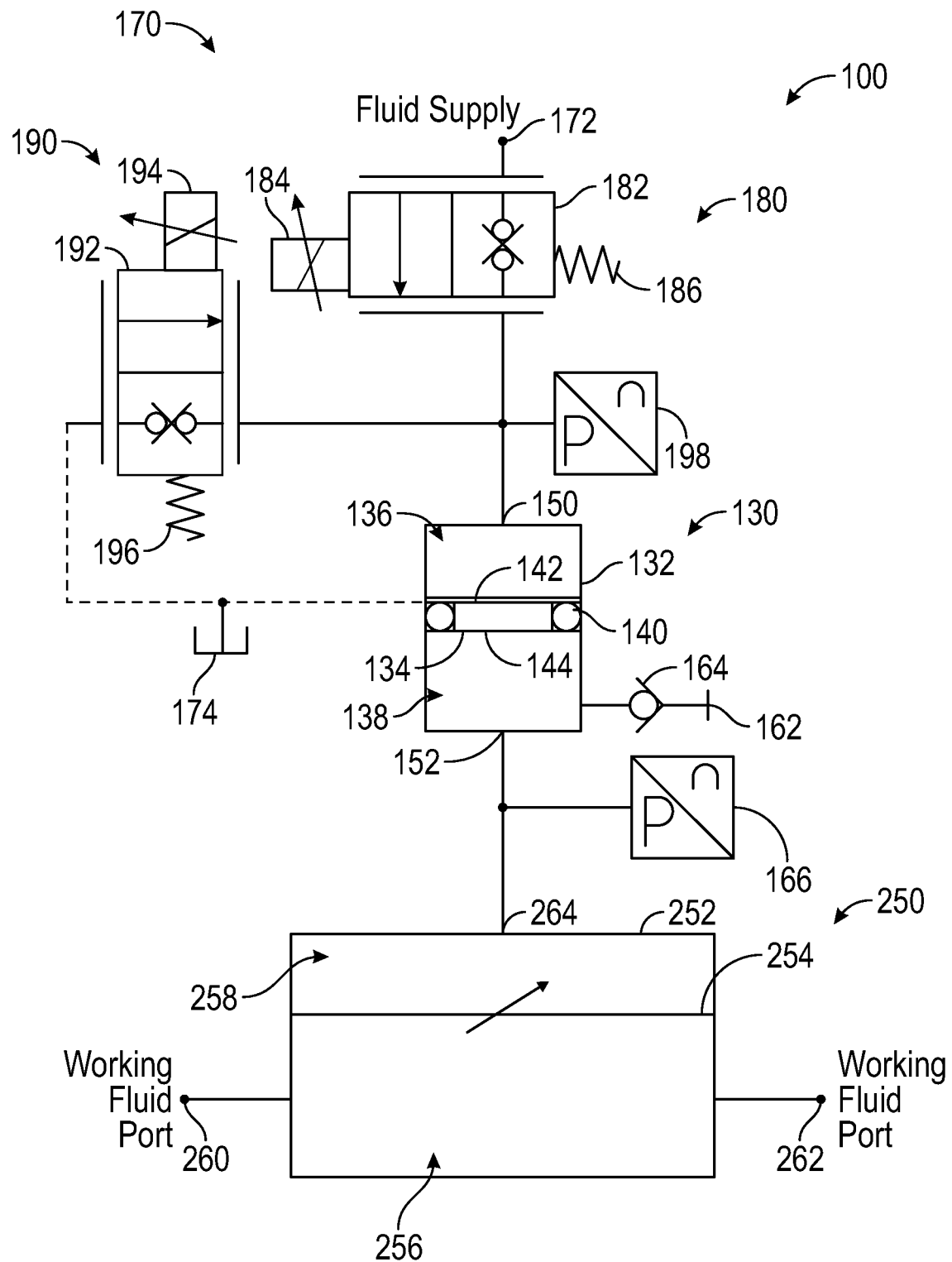
FIG. 6 is a schematic of a fluid system of the vehicle of FIG. 1, according to another exemplary embodiment.

Referring to FIG. 6, the fluid system 100 is shown according to an alternative embodiment. The fluid system 100 of FIG. 6 may be substantially similar to the fluid system 100 of FIG. 4 except as otherwise specified herein. Accordingly, any description with respect to the fluid system 100 of FIG. 4 may apply to the fluid system of FIG. 6, except as otherwise specified herein.

In the fluid system of FIG. 6, the accumulator 110 is omitted and replaced with an alternative reservoir, shown as attenuator 250. The attenuator 250 includes a case or body, shown as housing 252, having an internal volume. A movable barrier, shown as bladder 254, is positioned within the housing 252 and separates or divides the internal volume into a first reservoir chamber, shown as working fluid chamber 256, and a second reservoir chamber, shown as charge chamber 258. As shown, the bladder 254 is made of a flexible material that is fixed to the housing 252 along an edge to fluidly decouple the working fluid chamber 256 from the charge chamber 258, preventing the exchange of fluids between the working fluid chamber 256 and the charge chamber 258. In other embodiments, the bladder 254 is replaced with another type of movable barrier, such as a piston.

The working fluid chamber 256 is filled with a working fluid that is utilized by another component of the vehicle. Specifically, the housing 252 defines a first inlet/outlet port, shown as working fluid port 260, and a second inlet/outlet port, shown as working fluid port 262, through which fluid may enter or exit the working fluid chamber 256. The working fluid ports 260 and 262 may each act only as an inlet, only as an outlet, or switch between operating as an inlet or an outlet.

The charge chamber 258 is filled with a charge fluid. The housing 252 defines an additional inlet/outlet port, shown as charge port 264, through which charge fluid may enter or exit the charge chamber 258. The charge port 264 is fluidly coupled to the charge port 152. Accordingly, the charge port 264 and the charge chamber 258 function similarly to the charge port 122 and the charge chamber 118 of FIG. 4, respectively.

The attenuator 250 may function similarly to the accumulator 110 of FIG. 4, except the attenuator 250 includes two working fluid ports. Accordingly, the amount of working fluid in the working fluid chamber 256, and thus the volume of the working fluid chamber 256, is dependent upon the relative flow rates of working fluid through the working fluid port 260 and the working fluid port 262. If working fluid flows in through the working fluid port 260 at the same rate that working fluid flows out through the working fluid port 260, the total amount of working fluid within the working fluid chamber 256 may remain substantially constant. If working fluid flows in through one port (e.g., the working fluid port 260) more quickly than the working fluid exits the other port (e.g., the working fluid port 262), then the total amount of working fluid within the working fluid chamber 256 increases. If working fluid exits through one port (e.g., the working fluid port 260) more quickly than the working fluid enters through the other port (e.g., the working fluid port 262), then the total amount of working fluid within the working fluid chamber 256 decreases. Accordingly, the attenuator 250 may be suitable for attenuating (e.g., reducing in magnitude) fluctuations in the flow rate of fluid passing through the attenuator 250.

Figure 7:
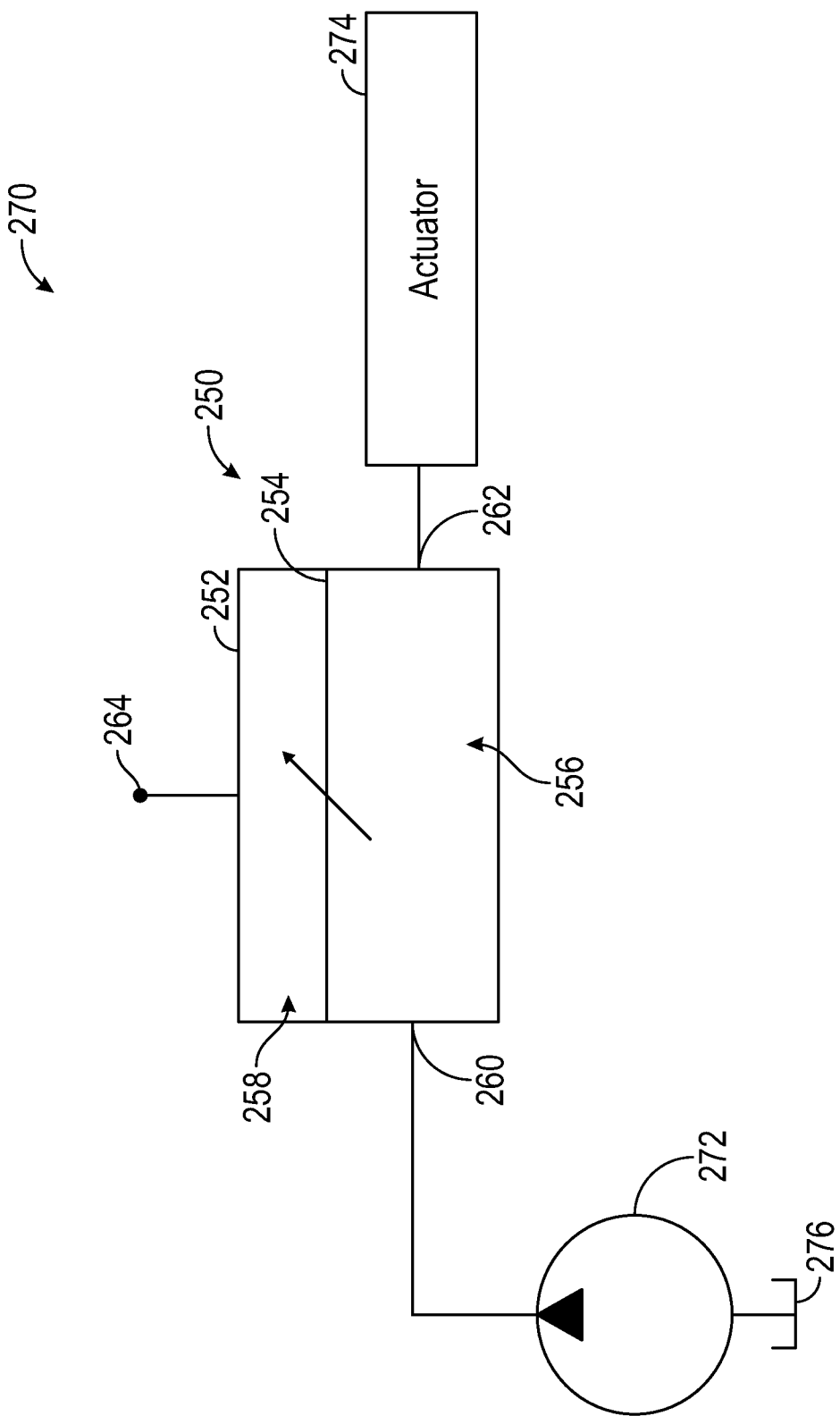
FIG. 7 is a schematic block diagram of a pump system of the vehicle of FIG. 1 that is controlled by the fluid system of FIG. 6, according to an exemplary embodiment.

Referring to FIG. 7, an implementation of the fluid system 100 of FIG. 6 is shown according to an exemplary embodiment. It should be understood that this is intended as a non-limiting example, and the fluid system 100 of FIG. 6 may be used with other systems according to other exemplary embodiments.

As shown in FIG. 7, the fluid system 100 of FIG. 6 is used to control a pump system 270. The pump system 270 includes hydraulic pump, shown as pump 272, that supplies working fluid to a consumer, shown as actuator 274. Specifically, the pump 272 supplies pressurized hydraulic fluid as the working fluid. In other embodiments, the pump 272 is replaced with a compressor that supplies pressurized gas (e.g., air). The pump 272 may receive the working fluid from a low-pressure fluid return, shown as tank 276. The pump 272 may be driven by a source of rotational mechanical energy, such as an electric motor or the prime mover 52. In some embodiments, the pump 272 supplies the control fluid to the fluid system 100. By way of example, the pump 272 may provide a single flow of hydraulic oil that splits or otherwise circulates to be distributed as both the working fluid and the control fluid. Accordingly, the pump 272 may act as the fluid supply 172.

The actuator 274 may be a hydraulic cylinder, a hydraulic motor, or another type of actuator that is powered or otherwise operated by a working fluid. The actuator 274 may be onboard the vehicle 10 or positioned separate from the vehicle 10. In some embodiments, the actuator 274 is part of an implement of the vehicle 10. The actuator 274 may include one or more valves (e.g., directional control valves) that vary the amount of fluid being supplied to the actuator 274.

The attenuator 250 fluidly couples the pump 272 to the actuator 274. Specifically, the working fluid port 260 is fluidly coupled to the pump 272, and the working fluid port 262 is fluidly coupled to the actuator 274. In operation, working fluid passes from the pump 272, through the working fluid port 260, and into the working fluid chamber 256. To exit the attenuator 250, the working fluid passes through the working fluid port 262 and to the actuator 274.

The attenuator 250 controls (e.g., modulates, attenuates, etc.) the flow of working fluid from the pump 272 to the actuator 274. The attenuator 250 may accomplish this by resisting an increase to the amount of working fluid within the working fluid chamber 256. By way of example, the charge fluid and the bladder 254 may apply a biasing force on the working fluid to resist an increase in the amount of fluid within the working fluid chamber 256 due to an increase in supply from the pump 272. By way of another example, the charge fluid and the bladder 254 may apply a biasing force on the working fluid to resist an increase in the amount of fluid within the working fluid chamber 256 due to an decrease in demand from the actuator 274 (e.g., a closing of a valve that supplies fluid to the actuator 274).

The fluid system 100 may vary the charge pressure of the charge fluid within the attenuator 250 to vary the response of the attenuator 250 to certain inputs. By way of example, the fluid system 100 may increase the charge pressure to increase the biasing force applied by the charge fluid and the bladder 254. By way of another example, the fluid system 100 may decrease the charge pressure to decrease the biasing force applied by the charge fluid and the bladder 254.

Control System

Referring to FIG. 8, the control system 300 is shown according to an exemplary embodiment. The control system 300 includes a processing circuit, shown as controller 302, that controls operation of the vehicle 10 (e.g., of the fluid system 100). The controller 302 includes a processing device, shown as processor 304, and a memory device, shown as memory 306. The memory 306 may store one or more instructions that, when executed by the processor 304, cause the processor 304 to perform one or more of the processes described herein.

As shown, the controller 302 is operatively coupled to the loading valve 180 and the unloading valve 190. The controller 302 may provide control signals (e.g., electrical signals, PWM signals, etc.) to the loading valve 180 and/or the unloading valve 190 to control operation of the loading valve 180 and/or the unloading valve 190. By way of example, the signals from the controller 302 may cause the solenoid 184 to move the spool 182. By way of another example, the signals from the controller 302 may cause the solenoid 194 to move the spool 192.

As shown, the controller 302 is operatively coupled to the charge pressure sensor 166 and the control pressure sensor 198. The controller 302 may receive pressure signals from the charge pressure sensor 166 indicating the pressure of the charge fluid. The controller 302 may receive pressure signals from the control pressure sensor 198 indicating the pressure of the control fluid within the control fluid chamber 136.

Referring still to FIG. 8, the control system 300 includes an input/output device, shown as user interface 310. The user interface 310 may facilitate communication between the controller 302 and a user (e.g., by communicating information to the user, by receiving commands from the user, etc.). The user interface 310 may include one or more input devices (e.g., a touchscreen, buttons, switches, knobs, microphones, etc.) that receive inputs (e.g., commands) from a user. The user interface 310 may include one or more output devices (e.g., displays, speakers, haptic feedback vibrators, etc.) that provide information to the user.

Referring still to FIG. 8, the control system 300 further includes a system condition sensor 320. The system condition sensor 320 is configured to provide a sensor signal (e.g., system condition data) indicative of a condition of the vehicle 10 that relates to operation of the fluid system 100. Specifically, the condition relates to operation of the reservoir (e.g., the accumulator 110, the attenuator 250).

In the system 100 of FIG. 7, the system condition measured by the system condition sensor 320 may relate to a flow rate of fluid from the pump 272. By way of example, the system condition sensor 320 may be a pump speed sensor configured to provide pump speed data indicating a current operating speed of the pump 272 (e.g., a rotational speed of the pump 272, a flow rate of working fluid out of the pump 272, etc.). By way of another example, in an embodiment where the prime mover 52, the system condition sensor 320 may be prime mover speed sensor (e.g., an engine speed sensor) configured to provide speed data indicating a current operating speed of the prime mover 52 (e.g., a rotational speed of the prime mover 52, etc.). In the system 100 of FIG. 5, the system condition measured by the system condition sensor 320 may relate to the suspension system 200 of the vehicle 10. By way of example, the system condition sensor 320 may be a displacement sensor configured to provide displacement data indicating a current position of the strut 220. By way of another example, the system condition sensor 320 may be a vehicle speed sensor configured to provide vehicle speed data indicating a current travel speed of the vehicle 10.

In some embodiments, the controller 302 uses the pressure signals from the charge pressure sensor 166 and/or the control pressure sensor 198 to perform closed-loop control of the fluid system 100. By way of example, the controller 302 may have a target pressure for a fluid within the fluid system 100 (e.g., the charge fluid and/or the control fluid). The controller 302 may increase the pressure of the charge fluid by opening the loading valve 180 and closing the unloading valve 190. The controller 302 may decrease the pressure of the charge fluid by closing the loading valve 180 and opening the unloading valve 190.

The controller 302 may determine the pressure of the charge fluid directly using the charge pressure sensor 166 and/or determine the pressure of the control fluid directly using the control fluid sensor 198. Alternatively, the controller 302 may determine the charge pressure or the control pressure indirectly. By way of example, the controller 302 may use the control pressure sensor 198 and the ratio between the area of the control surface 142 of the piston 134 and the area of the charge surface 144 of the piston 134 to determine the charge pressure. These areas may be predetermined (e.g., manually measured) and stored in the memory 306. The controller 302 may use the inverse of this ratio to determine the control pressure using the charge pressure measured by the charge pressure sensor 166.

In some embodiments, the controller 302 sets the target pressure based on a manual input by a user. By way of example, the user may provide a command through the user interface 310 requesting to increase or decrease the target pressure. By way of another example, the controller 302 may have various predetermined target pressures, and the user may select between the preset target pressures through the user interface 310.

In some embodiments, the controller 302 sets the target pressure based on the system condition measured by the system condition sensor 320. By way of example, the controller 302 may have a target range for the system condition, and the controller 302 may vary the target pressure to maintain the system condition within the target range. By way of another example, a relationship between the pressures of the fluid system 100 and the system condition may be predetermined and stored in the memory 306 (e.g., an increase in the system condition results in a corresponding increase in target pressure).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the control system 300, etc.) as shown in the various exemplary embodiments is illustrative only. Additionally, any element disclosed in one embodiment may be incorporated or utilized with any other embodiment disclosed herein.

What is claimed is:

1. A fluid system, comprising:
    a reservoir having a first reservoir chamber and a second reservoir chamber separated by a movable barrier, the first reservoir chamber being configured to contain a working fluid;
    a piston housing defining an internal volume;
    a piston movable within the internal volume, the piston separating the internal volume into a first piston chamber and a second piston chamber, the second piston chamber being fluidly coupled to the second reservoir chamber; and
    a fluid supply configured to provide a control fluid to the first piston chamber.

2. The fluid system of claim 1, further comprising a loading valve configured to selectively fluidly couple the fluid supply to the first piston chamber to direct the control fluid from the fluid supply to the first piston chamber.

3. The fluid system of claim 2, wherein the loading valve is a proportionally-controlled solenoid valve.

4. The fluid system of claim 2, further comprising an unloading valve selectively fluidly coupling the first piston chamber to a fluid return to direct the control fluid from the first piston chamber to the fluid return.

5. The fluid system of claim 4, wherein the unloading valve is a proportionally-controlled solenoid valve.

6. The fluid system of claim 4, wherein the second reservoir chamber and the second piston chamber contain a charge fluid, and wherein the charge fluid is a gas.

7. The fluid system of claim 6, further comprising:
    a service port configured to supply the control fluid; and
    a check valve fluidly coupled to the service port and the second piston chamber, wherein the check valve is positioned to prevent the control fluid flowing from the second piston chamber to the service port.

8. The fluid system of claim 6, further comprising a controller operatively coupled to the loading valve and the unloading valve and configured to control the loading valve and the unloading valve to vary a volume of the control fluid within the first piston chamber.

9. The fluid system of claim 8, further comprising a pressure sensor configured to provide pressure data indicating a pressure within the fluid system, wherein the controller is configured to control the loading valve and the unloading valve based the pressure data.

10. The fluid system of claim 9, wherein the pressure sensor is fluidly coupled to the first piston chamber, and wherein the pressure data indicates a pressure of the control fluid.

11. The fluid system of claim 10, wherein the piston has a first side exposed to the first piston chamber and a second side exposed to the second piston chamber, and wherein a first surface area of the first side is substantially equal to a second surface area of the second side.

12. The fluid system of claim 8, further comprising a pump fluidly coupled to the reservoir and configured to provide the working fluid to the first reservoir chamber, wherein the controller is configured to control the loading valve and the unloading valve based on a speed of the pump.

13. The fluid system of claim 1, wherein the movable barrier of the reservoir is a flexible bladder.

14. The fluid system of claim 1, wherein the reservoir is an accumulator having a working fluid port fluidly coupled to the first reservoir chamber.

15. The fluid system of claim 1, wherein the reservoir is an attenuator having two working fluid ports fluidly coupled to the first reservoir chamber.

16. A vehicle, comprising:
a chassis;
a tractive element coupled to the chassis;
an actuator coupled to the chassis; and
a fluid system including:
  a reservoir having a first chamber and a second chamber separated by a first movable barrier, the first chamber being fluidly coupled to the actuator and containing a first hydraulic fluid;
  a housing defining an internal volume;
  a second movable barrier within the internal volume, the second movable barrier separating the internal volume into a third chamber and a fourth chamber, the third chamber being fluidly coupled to the second chamber, and the second and third chambers containing a gas; and
  a fluid supply configured to provide a second hydraulic fluid to the fourth chamber.

17. The vehicle of claim 16, further comprising a prime mover configured to drive the tractive element to propel the vehicle,
wherein the fluid supply includes a pump driven by the prime mover, and wherein the pump supplies a flow of hydraulic fluid including the first hydraulic fluid and the second hydraulic fluid.

18. The vehicle of claim 17, further comprising:
a valve configured to selectively fluidly couple the pump to the fourth chamber; and
a controller operatively coupled to the valve and configured to control the valve to vary a volume of the second hydraulic fluid within the fourth chamber.

19. The vehicle of claim 18, further comprising a sensor configured to provide speed data indicating a current operating speed of the prime mover, wherein the controller is configured to control the valve based on the speed data.

20. A fluid system, comprising:
a first chamber fluidly coupled to an actuator;
a second chamber containing a gas;
a first movable barrier at least partially defining the first chamber and the second chamber;
a third chamber fluidly coupled to the second chamber and containing the gas;
a fourth chamber;
a second movable barrier at least partially defining the third chamber and the fourth chamber;
a first valve fluidly coupled to the fourth chamber and configured to direct a control fluid into the fourth chamber to move the second movable barrier in a first direction that decreases a volume of the third chamber; and
a second valve fluidly coupled to the fourth chamber and configured to direct the control fluid out of the fourth chamber to move the second movable barrier in a second direction that increases the volume of the third chamber.

* * * * *